2,752,319

HEAT-STABILIZED POLYVINYL CHLORIDE COMPOSITION

Paul H. Lipke, Jr., and Robert S. Montgomery, Midland, Mich., assignors to The Dow Chemical Company, Midland, Mich., a corporation of Delaware No Drawing. Application September 3, 1954, Serial No. 454,218

6 Claims. (Cl. 260—31.4)

This invention relates to heat-stabilized polymeric compositions. More particularly, it relates to heat-stabilized polyvinyl chloride compositions.

It is known that polyvinyl chloride undergoes degradation and darkening when heated during fabrication operations such as molding or extrusion. To overcome this tendency, and to facilitate the fabrication of useful articles, polyvinyl chloride is blended before heat-forming operations with plasticizers to lower the required forming temperatures and with stabilizers to minimize the degrading effects of heat. Among the more effective stabilizers are various metal salts of inorganic or organic acids and various organometallic, especially organotin, compounds. Among the more effective plasticizers are various glycol and polyglycol esters and ether esters. Unfortunately, the metal compounds useful as stabilizers for the polyvinyl chloride adversely affect the stability of the desirable glycol esters, and these agents cannot be used in combination with polyvinyl chloride unless protection is provided for the glycol ester plasticizer.

It is accordingly an object of this invention to provide a novel heat stabilized, plasticized polyvinyl chloride composition. A related object is to provide a stabilized composition comprising a glycol ester plasticizer and a metal compound to be blended with polyvinyl chloride.

The above and related objects are accomplished with a formulation comprising polyvinyl chloride, one or more glycol esters of organic acids, a triaryl phosphite to stabilize the glycol ester, and certain metal compounds as heat stabilizers. When these compositions are exposed to the temperatures normally found in heat fabricating operations, a surprising and unexpected effect is noted as the plasticizer is not degraded by the metal compound and the whole composition is stable to heat.

The glycol esters which are useful in the compositions of this invention are prepared from those mono, di, and tri-alkylene glycols or their monoethers in which each alkylene group contains from 2 to 3 carbon atoms and mono- and di-basic organic carboxylic acids. When dibasic acids are used, di-esters may be employed. Likewise both aliphatic and aromatic carboxylic acids are useful. Representative examples of suitable esters are diethylene glycol monopropionate, diethylene glycol dipropionate, dipropylene glycol monopropionate, diethylene glycol distearate, dipropylene glycol dicaproate, ethylene glycol distearate, diethylene glycol monobenzoate, diethylene glycol dibenzoate, and dipropylene glycol dibenzoate. Other typical examples of such compounds are propionic acid (tripropylene glycol methyl ether) ester, acetic acid (tripropylene glycol methyl ether) ester, diethylene glycol bis(monochloroacetate), diethylene glycol phenoxyacetate, adipic acid bis(dipropylene glycol monobutyl ether) ester, sebacic acid bis(2-isopropoxy isopropyl) ester, maleic acid isobutyl 2,3-epoxypropyl ester, tetrahydrophthalic acid bis(propyleneglycol methyl ether) ester, dipropylene glycol disalicylate. All of the above compounds are known to have a plasticizing effect on polyvinyl chloride.

Any triaryl phosphite may be employed in the compositions of this invention with the obvious exceptions of those having amino or other strongly basic groups, known to degrade halogenated polymers. Typical examples of useful phosphites are phenyl di(meta or para) tolyl phosphite, tri(orthocyclohexylphenyl) phosphite, 2-biphenyl diphenyl phosphite, carvacryl bis(ortho-chlorophenyl) phosphite, ortho-chlorophenyl diphenyl phosphite, para-tertiary-butylphenyl diphenyl phosphite, tri(2-biphenyl) phosphite, tris[para(1,1,3,3-tetramethylbutyl)] phenyl phosphite, and triphenyl phosphite. The amount of such phosphites to be used is from 0.1 to 10 (preferably 0.3 to 3) per cent of the weight of the glycol ester.

The compositions of this invention include metallic compounds which are normally stabilizers for polyvinyl chloride in the presence of the common non-glycol plasticizers such as dioctylphthalate. Typically these are inorganic metal salts such as the basic silicate of lead, dibasic lead phosphite, dibasic lead phosphate, and lead carbonate. Organic acid salts may be employed, such as lead stearate and aluminum, zinc, cadmium, and barium salts of fatty acids. Also, organometallic compounds such as dibutyl tin maleate are known to stabilize polyvinyl chloride and may be used. Such compounds are well-known as stabilizers for polyvinyl chloride but when used with polyvinyl chloride and the glycol plasticizers of this invention, but without the phosphites, considerable darkening of the compositions results upon exposure to milling temperatures. This darkening occurs in the plasticizer. Thus, the metallic compounds stabilize the polyvinyl chloride and at the same time degrade the plasticizer. When the metal compound is omitted and only the triaryl phosphite, glycol plasticizer, and polyvinyl chloride are milled together, considerable darkening occurs. When the phosphite is also omitted and only the glycol plasticizer and polyvinyl chloride are milled, the mixture shows much decomposition in a very short time.

The polyvinyl chloride and plasticizer may be used in any conventional proportions. It is well known in the art that when rigid articles are desired very little plasticizer is used and when pliable or non-rigid articles are desired large amounts of plasticizer are required, often up to 70 per cent of the composition.

The amount of the metal compound stabilizer that may be used will also vary in known manner depending on the end use of the formulation, and will usually be from 0.3 to 5 per cent of the weight of polyvinyl chloride present. When the metal compound is used for its pigmenting effect, much larger amounts may be used.

The compositions of the invention will be more apparent from the following illustrative example. All parts are by weight.

*Example 1*

A polyvinyl chloride composition was prepared according to the following formulation: 51.25 parts of polyvinyl chloride, 45 parts diethylene glycol dibenzoate, 3 parts of lead silicate, 0.75 part basic lead stearate, and 0.18 part triphenyl phosphite. After milling at 340° F. for 10 minutes, a sheet was formed from which test strips were cut. The test strips were heated in an oven for 2 hours at 330° F. and only a very slight yellow tinge of color was noted.

By way of contrast, a similar composition to the above was prepared without any triphenylphosphite. When test strips from this formulation were heated at 330° F., the same degree of discoloration was observed in ¾ hour, and the composition was tan colored in 2 hours.

When test strips prepared from the original composition, but omitting the lead silicate and basic lead stearate, were heated at 330° F., considerable decomposition and darkening occurred in ½ hour.

*Example 2*

Compositions similar to those of Example 1 were prepared substituting the following glycol esters for the diethylene glycol dibenzoate: diethylene glycol monobenzoate, diethylene glycol distearate, diethylene glycol bis(monochloroacetate), dipropylene glycol disalicylate, dipropylene glycol dibenzoate, dipropylene glycol dicaproate, dipropylene glycol monopropionate, dipropylene glycol dicarbamate, adipic acid, bis(dipropylene glycol monobutylether) ester, sebacic acid, bis(2-isopropoxy isopropyl) ester, maleic acid, isobutyl 2,3-epoxypropyl ester, diethylene glycol dipropionate, propionic acid, (tripropylene glycol methyl ether) ester, diethylene glycol monopropionate, tetrahydrophthalic acid, bis(propylene glycol methyl ether) ester, acetic acid (tripropylene glycol methyl ether) ester, glycol distearate, and diethylene glycol diphenoxyacetate. The glycol ester plasticizers were stabilized by introducing into the compositions from 0.3 to 3 per cent, based on the weight of glycol ester, of one or more of the following triaryl phosphites: phenyl ditolyl phosphite, tri(cyclohexyl phenyl) phosphite, 2-biphenyl diphenyl phosphite, carvacryl diorthochlorophenyl phosphite, orthochlorophenyl diphenyl phosphite, tertiarybutylphenyl diphenyl phosphite, tri-2-biphenyl phosphite, tri-tertiaryoctylphenyl phosphite and triphenyl phosphite. In all cases the same marked improvement in heat stability was noted in Example 1 in the compositions containing the triaryl phosphite over those compositions having no phosphite.

We claim:

1. A heat stable polymeric composition consisting essentially of (1) polyvinyl chloride, (2) an alkylene glycol ester, whereof the glycol constituent is selected from those mono-, di-, and trialkylene glycols and their monoethers wherein the alkylene group contains from 2 to 3 carbon atoms and the acid constituent is from the group consisting of organic mono- and dicarboxylic acids, (3) from 0.1 to 10 per cent based on the weight of the glycol ester of a triaryl-phosphite, free from strongly basic groups, and (4) a heat stabilizer for polyvinyl chloride from the group consisting of basic silicate of lead, dibasic lead phosphite, dibasic lead phosphate, lead carbonate, and lead stearate.

2. The composition claimed in claim 1 wherein the glycol ester is diethylene glycol dibenzoate.

3. The composition claimed in claim 1, wherein the glycol ester is dipropylene glycol dibenzoate.

4. The composition claimed in claim 1, wherein the triaryl phosphite is triphenyl phosphite.

5. The composition claimed in claim 1, wherein the heat stabilizer for polyvinyl chloride is present in amount of 0.3 to 3 per cent, based on the weight of polyvinyl chloride.

6. The composition claimed in claim 1, wherein the heat stabilizer for polyvinyl chloride is basic lead stearate.

References Cited in the file of this patent

UNITED STATES PATENTS 2,456,231    Wiley _____ Dec. 14, 1948